United States Patent [19]

Hoffman et al.

[11] Patent Number: 4,817,037
[45] Date of Patent: Mar. 28, 1989

[54] DATA PROCESSING SYSTEM WITH OVERLAP BUS CYCLE OPERATIONS

[75] Inventors: Harrell Hoffman, Austin; Charles G. Wright, Round Rock, both of Tex.

[73] Assignee: International Business Machines Corporation, Armonk, N.Y.

[21] Appl. No.: 14,757

[22] Filed: Feb. 13, 1987

[51] Int. Cl.⁴ ............................................. G06F 13/36
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,812,475 | 5/1974 | Christiansen et al. | 340/172.5 |
| 3,997,896 | 12/1976 | Cassarino, Jr. et al. | 364/200 |
| 4,001,790 | 1/1977 | Barlow | 340/172.5 |
| 4,050,097 | 9/1977 | Miu et al. | 364/200 |
| 4,085,448 | 4/1978 | Kogge | 364/900 |
| 4,120,029 | 10/1978 | Steiner | 364/200 |
| 4,181,974 | 1/1980 | Lemay et al. | 364/900 |
| 4,236,203 | 11/1980 | Curley et al. | 364/200 |
| 4,257,099 | 3/1981 | Appelt | 364/200 |
| 4,591,967 | 5/1986 | Mattes et al. | 364/132 |
| 4,748,586 | 5/1988 | Bonci | 364/900 |
| 4,750,111 | 6/1988 | Crosby, Jr. et al. | 364/200 |

OTHER PUBLICATIONS

IBM Technical Disclosure Bulletin, vol. 28, No. 12, May 1986, "High-Speed Processor Bus Arbitration".

Primary Examiner—Gareth D. Shaw
Assistant Examiner—Maria Napiorkowski
Attorney, Agent, or Firm—Thomas E. Tyson

[57] ABSTRACT

A data processing system including several devices connected to an asynchronous communications bus for communications between these devices. The communications bus includes a protocol that requires only a single device to regulate communication between devices at any one time. This regulating device is termed the bus master and the remaining devices are termed slaves. This protocol provides the capability for a slave device to indicate to the bus master that a new bus master is to be designated for a temporary communication. This communication with a different bus master then occurs during the communication of the designated bus master.

11 Claims, 6 Drawing Sheets

SYSTEM BLOCK DIAGRAM

ORIGINAL BUS MASTER CONTROL FLOW

DATA PROCESSING SYSTEM WITH OVERLAP BUS CYCLE OPERATIONS

TECHNICAL FIELD

This invention relates to data processing system communication and more specifically to a data processing system including a plurality of units connected to a common information bus for the transfer of information between the units.

BACKGROUND ART

Communications between data processing systems have become more complex with the increased capability of individual data processing units. This communication capability is commonly termed networking. The specific area of interest for this invention is a single information bus connected to several processor units and several peripheral units. Traditionally, one processor unit is programmed to regulate the communications over the bus between the processing units and the peripheral units. In network terminology the communications controlling processor is termed the bus master and the remaining communication units termed slaves. In such a networking arrangement only the bus master may initiate any communications transactions on the bus. The slave units are only allowed to respond to communications from the bus master. A variation of this type of network provides for the bus master responsibility to be transferred among the processing units. In this manner any processor may address a peripheral device. If two processors desire to be bus master at the same time, a collision can occur on the information bus. Therefore, arbitration circuitry is provided to designate one of the communication bus requesting processors as the bus master.

An example of the above data processing system is disclosed in U.S. Pat. No. 3,997,896, entitle "Data Processing System Providing Split Bus Cycle Operation", which discloses a data processing system including a common bus and several units connected to transfer information asynchronously, wherein logic is provided for enabling a split bus cycle operation where a bus master unit requesting information from a slave during a first bus cycle may receive that information from the slave during a later bus cycle. This slave, at the later bus cycle requests that the bus arbiter designate the slave as bus master in order that the slave may provide that information to the original bus master. Further disclosures of this type of bus architecture are contained in U.S. Pat. No. 4,181,974, entitled "System Providing Multiple Outstanding Information Request" and U.S. Pat. No. 4,236,203, entitled "System Providing Multiple Fetch Bus Cycle Operation".

In each of the above patents, the slave device is required to become bus master at the time the information that was originally requested becomes available. However, some slave devices do not include the capability to function as a bus master. Therefore, it is an object of the present invention to provide a data processing system including a communications bus that enables a slave that cannot become bus master to provide requested information during later bus cycles.

DISCLOSURE OF THE INVENTION

In accordance with the present invention a data processing system including three devices connected to an asynchronous communications bus for the communications between the devices is disclosed. The communications bus includes a protocol that requires that only a single device regulate communications over the bus at any one time. The communications bus further includes circuitry for designating one of the devices to regulate the communications on this bus. The communications bus also includes circuitry to receive a request from another device to temporarily designate a second device to regulate communications and afterwards to redesignate the original regulating device.

In the preferred embodiment a communications interface is connected to several devices that are capable of regulating communications over a communications bus. Also connected to this communications bus are several peripheral devices. The interface to the communications bus for each of the devices connected includes circuitry to perform a protocol for the orderly transfer of information over the communications bus. In this communications circuitry is an arbitration circuit that designates one of the potential bus master devices as the bus master. The remaining devices are designated as slave devices that must respond to the bus master in accordance with the protocol. This communications bus circuitry further includes the capability to receive a request from any slave device to temporarily redesignate a potential bus master as a temporary bus master in order to establish a temporary communications exchange. After the temporary communications has been completed, the first bus master is then redesignated as bus master. In this embodiment, the bus master is required to provide a timing signal on the bus. When the designation of the bus master is changed, the first bus master will cease to provide this timing signal and the new bus master will begin providing this timing signal.

In the present embodiment the bus interface circuits at each of the connected devices include circuitry to provide information from the bus to that device plus circuitry interconnecting to the other communications bus interfaces for providing information to the other devices. This interconnection of communication bus interfaces enables communication bus control signals to be interchanged among the bus interfaces to enable each device to communicate in accordance with the protocol. The present invention is directed specifically to the establishment of a temporary communication between two devices neither of which is the current bus master. This is termed an overlap bus communications cycle. In the present embodiment one of the slave devices includes the capability to perform complex operations that take a long time relative to the bus cycles and would normally require a long access time to complete. An original bus master may initiate an operation with the long access slave and then surrender control of the bus to a new bus master. When the long access slave has completed the operation and has the response for the original bus master, the long access slave provides a signal on the communications bus to alert the new bus master that a temporary communications cycle to the original bus master is required. In accordance with this invention the new bus master then surrenders control of the bus to the original bus master which then receives the response from the long access slave. After the response from the long access slave is received, the new bus master resumes control of the bus.

In this embodiment the protocol to facilitate this temporary communications requires the long access slave to provide a signal on the communications bus which is received by both the new bus master and the original bus master. The new bus master then issues a second timing signal which is received by the original bus master. The original bus master then issues a third timing signal which initiates the data transfer from the long access slave to the original bus master. After this temporary communications is completed, the original bus master ceases to provide this timing signal enabling the new bus master to reassert control over the bus.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures; wherein:

BEST MODE FOR CARRYING OUT THE INVENTION

Figure 1:
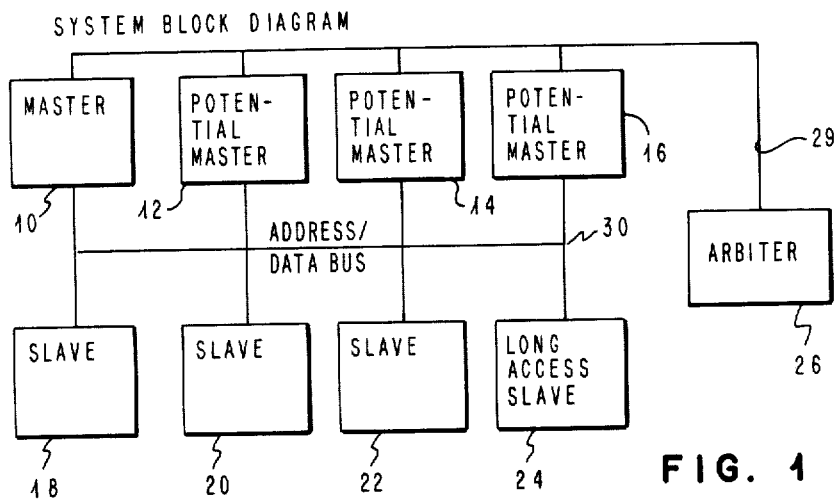
FIG. 1 is a block diagram of a communications bus connecting a bus master, several potential bus masters, and several slaves including a long access slave.

FIG. 1 is a system block diagram illustrating the connection of a master device 10 to a communications bus 30. Also connected to the communication bus 30 are three potential master devices 12, 14 and 16 and four slave devices 18, 20, 22 and 24. Slave device 24 is a long access slave device. The normal communications transaction over bus 30 would require the bus master 10 providing a request for information from one of the slave devices 18, 20, 22, or 24 or from one of the potential bus masters 12, 14 or 16 and having that information provided in that same cycle. The bus master 10 may also initiate a long access operation with a long access slave 24 wherein the bus master 10 initially establishes the operation over the bus 30 with the long access slave 24 and then in a later bus cycle requests the information from the long access slave 24. However, this would require that the bus master 10 retain control of the bus throughout the communications with the long access slave 24.

An arbiter circuit 26 is also provided in FIG. 1. The arbiter circuit designates which of the potential bus master devices 12, 14 and 16 would become a new bus master after master device 10 has completed its communications task. Therefore, any of the potential bus master devices 12, 14 or 16 or the bus master 10 have the potential for communicating with any other device on the bus. The present invention solves the problem of how a bus master that initiates a long operation with a long access slave 24 and then surrenders control of the bus to a new bus master can receive its response. Without this invention, the original bus master cannot know when the operation by the long access slave 24 is complete until it again is designated bus master by the arbiter circuit 26. This disadvantage can seriously affect system performance.

The present invention solves this problem by enabling the long access slave 24 to provide a signal on communications bus 30 indicating that the long operation has been completed and that a temporary communications cycle with the originating device is required. In response, the new bus master then temporarily surrenders control of the bus to the originating device or original bus master so that the original bus master may receive the response from the long access slave 24.

Figure 2:
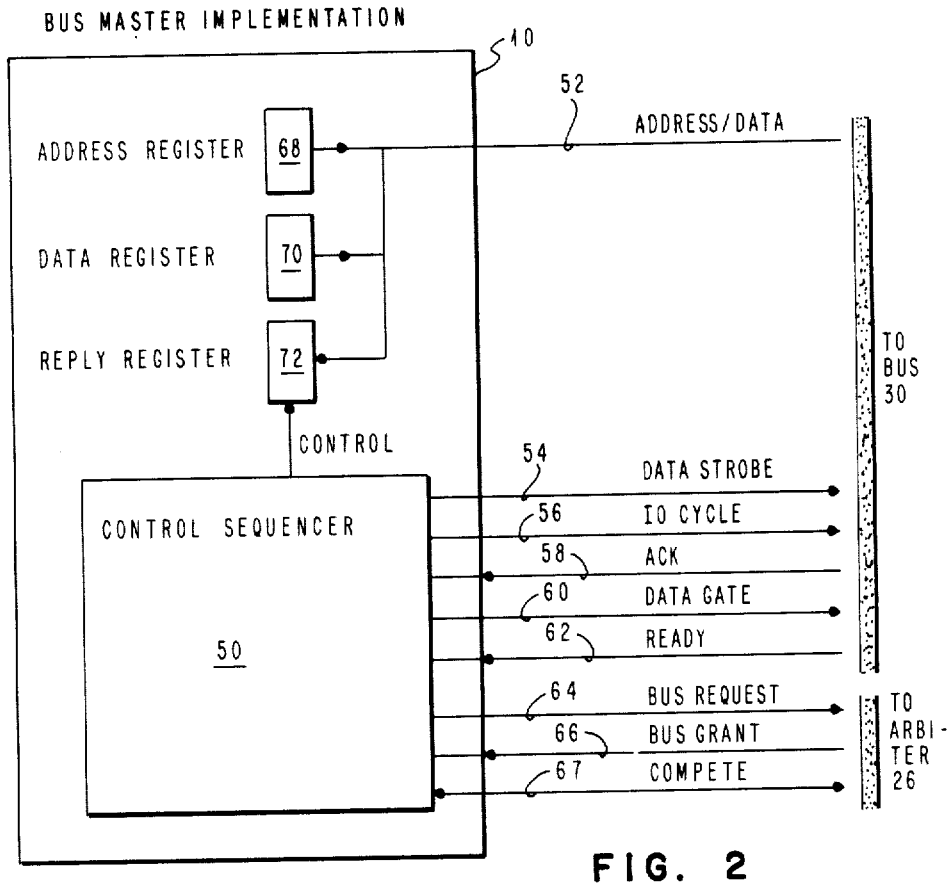
FIG. 2 is a block diagram of the bus interface circuitry for a bus master or potential bus master.

FIG. 2 illustrates in block diagram form the bus 30 interface of a bus master 10. This interface 10 maybe connected to other processors or even to another bus. This additional capability will originate and receive information transfers on the bus 30. While an interconnection is not shown, it should be apparent to those skilled in the art that such connections may be either directly to the address register 68, data register 70, and reply register 72 or through the control sequencer 50. This diagram is identical for the potential bus master devices 12, 14 and 16 of FIG. 1. The address and data are provided on line 52 to bus 30. Line 52 is connected to an address register 68, a data register 70 and a reply register 72 that is controlled by a bus control sequencer 50. Bus control sequencer 50 also interfaces to several control lines to bus 30. These include the DATA STROBE 54, the IO (Input/Output) cycle 56, the ACK (acknowledge) 58, the DATA GATE 60 and READY signal 62. Additionally, the bus controller sequencer 50 interfaces to arbiter 26 via line 29 by providing a BUS REQUEST signal on line 64, a BUS GRANT signal on line 66, and a bus cycle COMPETE signal on line 47. The bus master 10 provides the IO cycle signal on line 56 and the DATA GATE signal on line 60 to control communications over the bus 30. The BUS REQUEST line 64 is used to request designation as bus master by arbiter 26. Designation as bus master is signified by the BUS GRANT line 66. The COMPETE line 67 is used to indicate to the arbiter 26 when the bus master is giving up bus control and is an indication to other potential bus masters as the period to request bus control from the arbiter 26.

Figure 3:
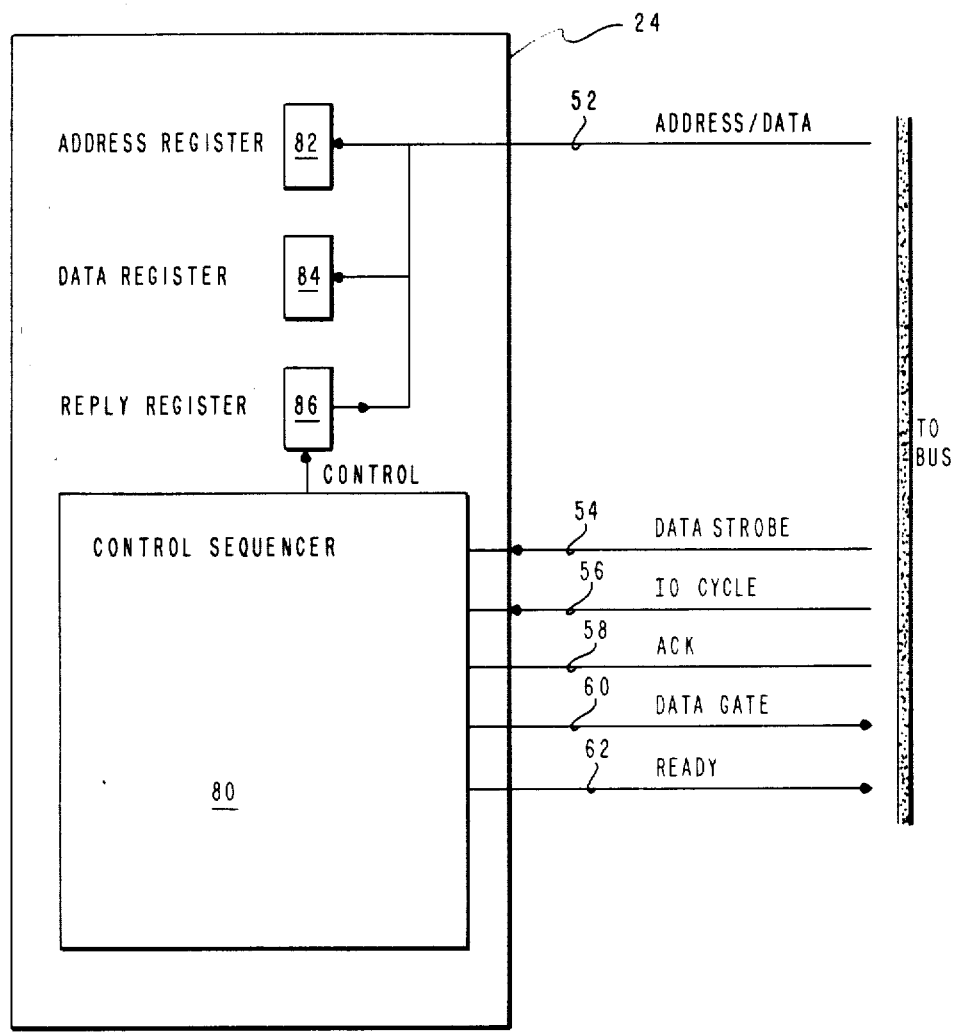
FIG. 3 is a block diagram of the bus interface circuitry for a slave device.

A block diagram of the bus interface circuit for a slave device 24 is illustrated in FIG. 3. Line 52 containing address and data information connected to communication bus 30 is also connected to an address register 82, a data register 84 and a reply register 86. These registers 82, 84 and 86 are connected to the bus control sequencer 80 which is further connected to the bus control lines shown. The bus control lines include the DATA STROBE line 54, IO cycle line 56, the ACK line 58, the DATA GATE line 60 and the READY line 62.

Figure 4A:
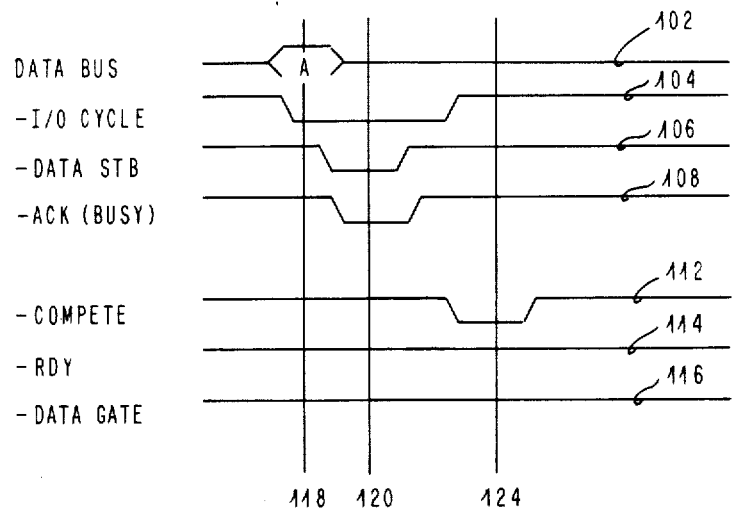
FIG. 4A is a timing diagram illustrating the initial communications timing between an original bus master and a long access slave.

FIG. 4A illustrates the timing of the control line for a bus master initiating a long operation with a long access slave 24. Data is placed on line 102 at time 118 via the bus master. The bus master initiates the bus transfer by activating or lowering the IO cycle 104. A DATA STROBE is provided on line 106 by this original bus master. The slave device 24 acknowledges by providing a ACK signal on line 108 at time 120. If the bus master is completed with its communications on bus 30, then the bus master drops COMPETE line 112 at time 124 indicating to the arbiter circuit 26 that a new bus master is to be designated. The READY line 114 and the DATA GATE line 116 are not activated during this transaction.

Figure 4B:
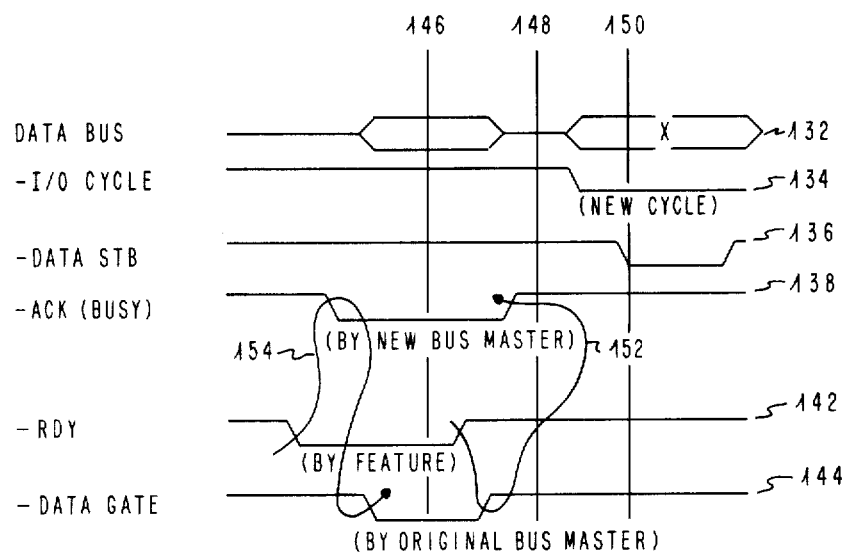
FIG. 4B is a timing diagram illustrating the redesignation of the original bus master as master and the completion of the temporary communications with the long access slave.

FIG. 4B illustrates the timing when the new bus master has control of the bus. The new bus master controls the bus by lowering the IO cycle on line 134 when it is performing transactions over the bus. The communications bus protocol provides that when this new bus master raises the IO cycle line 134 (in other words there is no current bus transaction) a device such as the long access slave 24 requiring a temporary transfer may indicate to the new bus master that this long access slave 24 desires to provide a response to the original bus master. This protocol is the signal handshake sequence 154. The long access slave device 24 provides such an indication by activating the READY signal line 142. At this time the new bus master activates the ACK signal line 138 indicating that it has received the READY signal from the long access slave device and that it is willing to temporarily surrender control of the bus. It should be understood that the ACK signal is normally used by a device responding to a bus master during an active I/0 cycle. The original bus master then indicates that it is taking control of the bus by activating the DATA GATE line 144. Therefore, at time 146 the original bus master has received control of the bus from the new bus master. The slave device 24 is placing data on line 132 at this time. The response data is then received by the original bus master on line 132 at time 146. The protocol to end this temporary communication is the signal handshake sequence 152. The long access slave 24 upon seeing that the DATA GATE signal 144 has been activated, deactivates the READY signal on line 142. After the original bus master has completed receiving the data on line 132, the original bus master indicates to the new bus master that control of the bus is being returned to the new bus master by deactivating the DATA GATE line 144. The new bus master then indicates that it is assuming control of bus by deactivating the ACK line 138. Therefore, at time 148, the new bus master is back in control of the bus. At time 150 the new bus master has initiated a new bus communications cycle indicated by data on DATA BUS 132 and the DATA STB (strobe) 136.

Figure 5:
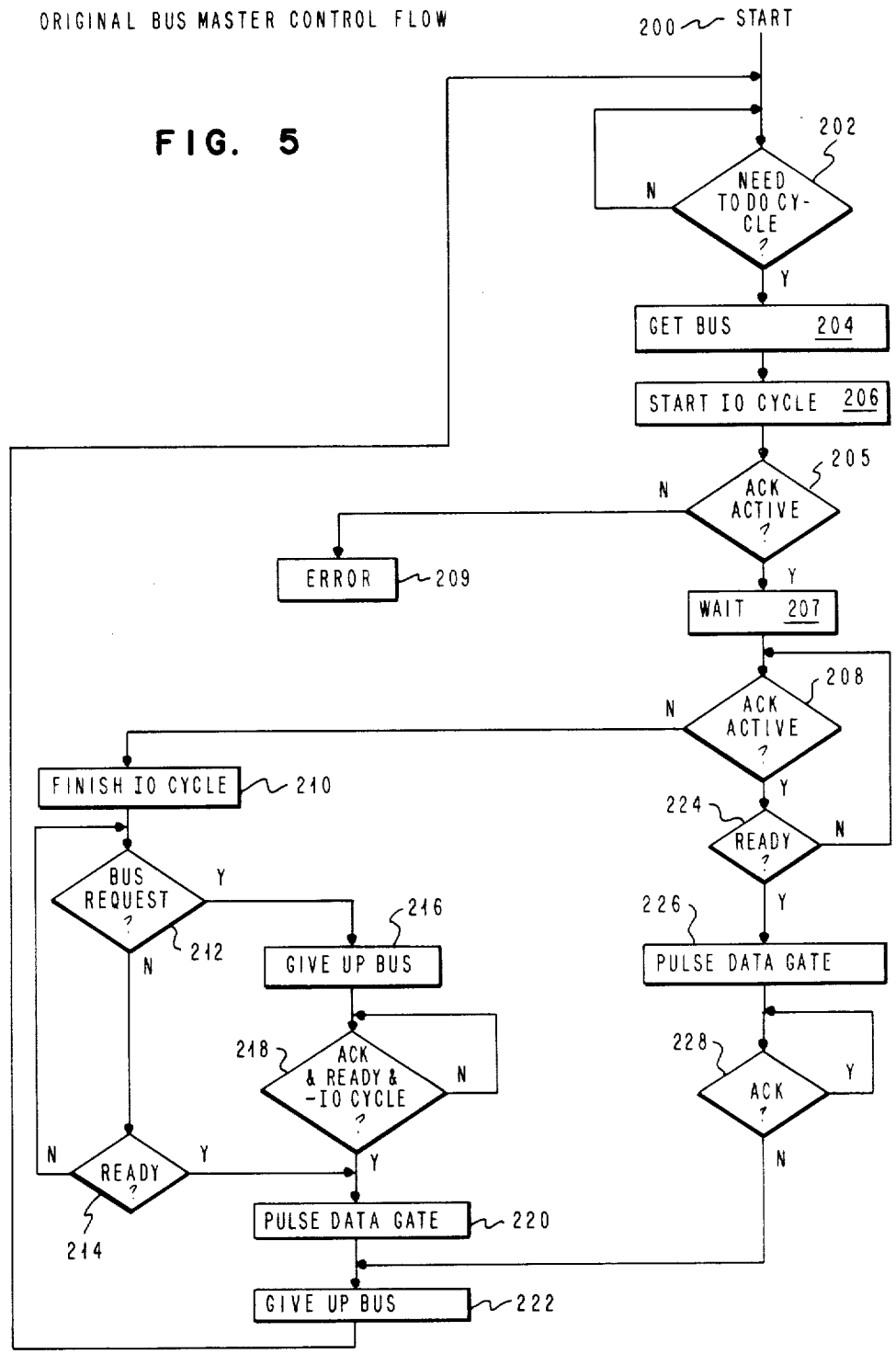
FIG. 5 is a flow chart of the bus control sequencing performed by the original bus master.

FIG. 5 is a flow chart of the bus control sequence for the original bus master executing this overlap communications operation. The original bus master starts at step 200 and determines if it needs to perform a cycle in 202. When it determines that a cycle is to be performed, the sequencer proceeds to step 204 to request control of the bus from the arbiter 26. Once control has been granted the sequencer proceeds to step 206 to start an IO cycle on bus 30. As previously discussed this is initiated by activating the IO cycle line 56 (FIG. 2). The sequencer then determines if an ACK is active in step 205. If an ACK has not been received, in other words the slave has not acknowledged the bus transmission, the sequencer goes to step 209 to indicate an error condition. If the ACK is received in step 205 the sequencer proceeds to step 207 to wait for a predetermined time. After the time the sequencer proceeds to step 208 to determine if the ACK signal remains. If an acknowledge (ACK) signal remains, the sequencer proceeds to step 224 to determine if a READY has been received on line 62. If not, he sequencer loops back to step 208. If so, the sequencer then proceeds to step 226 where the data gate line 60 is pulsed indicating that data is to be transmitted or received on the bus. The master then look for the acknowledge (ACK) line to become inactive in step 228. Upon the inactivation of the acknowledge (ACK) line, the sequencer proceeds to step 222 to give up the bus by signaling the arbiter 26.

Returning to step 208, if the acknowledge (ACK) signal is not received, the sequencer proceeds to step 210 to finish the IO cycle. This would indicate a long access requirement by the slave device being communicated with by the bus master. The sequencer then proceeds to step 212 to determine if any other devices on the bus are requesting access to the bus. If not, the sequencer proceeds to step 214 to look for the READY signal from the long access slave device 24 and continues in this loop if READY has not been received. If READY is received the sequencer proceeds to step 220. If another device is requesting access in step 212, the sequencer proceeds to step 216 to indicate to the arbiter 26 that it is giving up the bus. The sequencer then proceeds to step 218 where it monitors the ACK, READY and IO CYCLE lines waiting for the conditions illustrated in FIG. 4B to occur. When this occurs, the sequencer proceeds to step 220 to pulse the data gate line 60. Upon receiving the results from the long access slave 24, the sequencer of the original bus master then proceeds to step 222 to give up the bus by signaling the arbiter 26 and returning to the start position 200.

Figure 6:
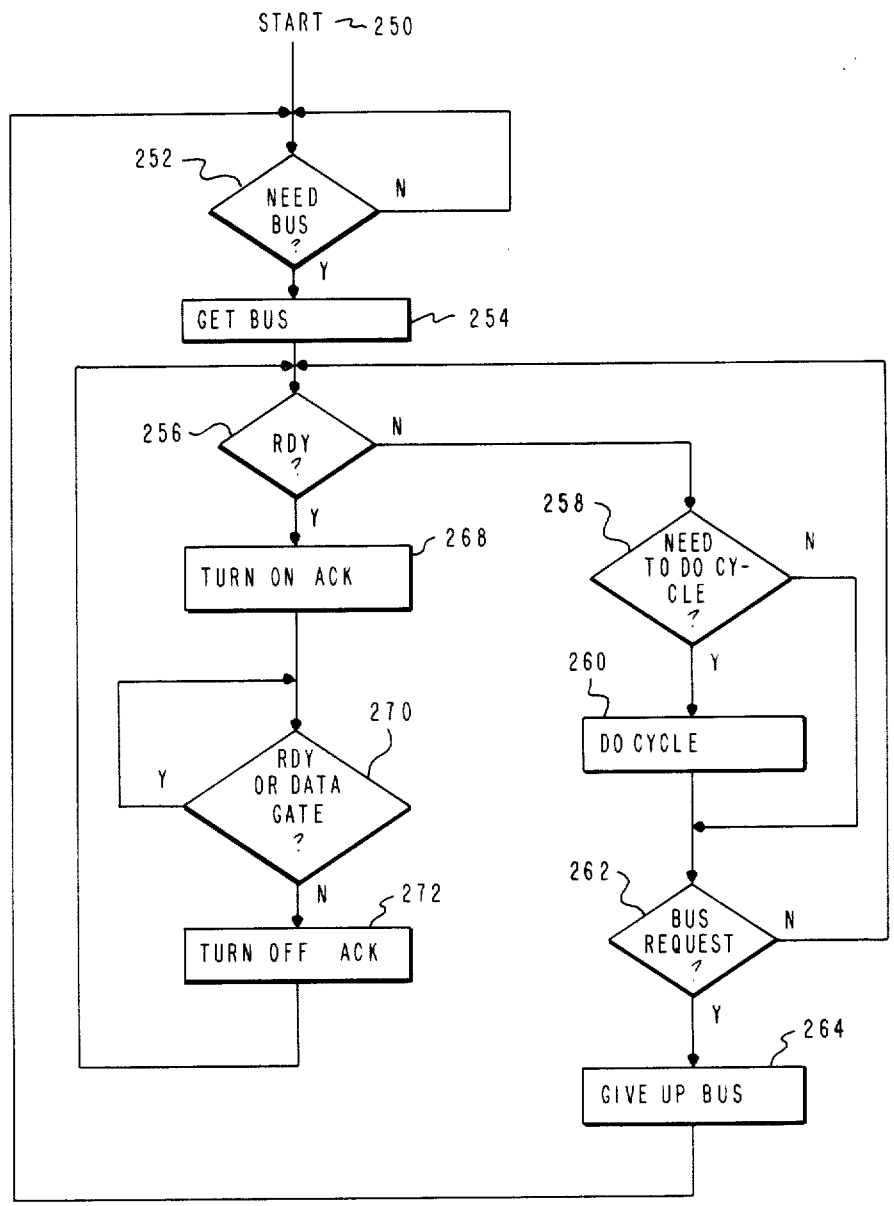
FIG. 6 is a flow chart illustrating the bus control sequence performed by the new bus master.

FIG. 6 illustrates a flow chart of the bus control process for a new master. The new master starts at position 250 and proceeds to step 252 to determine if it in fact needs the bus. If it does not, it returns to the start position. If the new bus master requires the bus, then the new bus master sequencer proceeds to step 254 to request control of the bus from the arbiter 26. The sequencer then proceeds to step 256 to determine if the READY signal is present on the bus indicating that a long access slave device is requesting temporary communications with its original bus master. If no READY signal is present, then the new bus master sequener proceeds to step 258 to determine if it needs to do a bus cycle. If a cycle is required, then the new bus master sequencer proceeds to step 260 to perform this cycle. If no cycle is required, the new bus master proceeds to step 262 to determine if any other devices connected to the bus are requesting control of the bus. If control of the bus by another device is being requested, the new bus master sequencer proceeds to step 264 to indicate to the arbiter 26 that it is giving up the bus. The sequencer then returns to the tart position 250. If no other device is requesting control of the bus in step 262, the new bus master sequencer returns to step 256 to determine if a READY signal is present.

Returning to step 256, if a ready signal is present, the new bus master sequencer proceeds to step 268 to turn on the ACK line 58 to indicate to the original bus master that this new bus master is temporarily surrendering control of the bus. It should be understood that this ACK signal is not normally used by a bus master but used by a slave device in responding to a bus master.

The new bus master sequencer then proceeds to step 270 to determine if the DATA GATE signal has been activated and if the READY signal remains active. As long as either the READY or the DATA GATE signals are active, the new bus master sequencer will loop back to step 270. When the READY line and/or the DATA GATE line have been deactivated, the new bus master sequencer proceeds to step 272 to turn off the ACK line 58 indicating that the new bus master is again asserting control over the bus The new bus master sequencer then returns to step 256.

It should also be understood that the procedures illustrated in FIGS. 5 and 6 are stored in all potential bus master devices to be executed in the appropriate circumstances.

Figure 7:
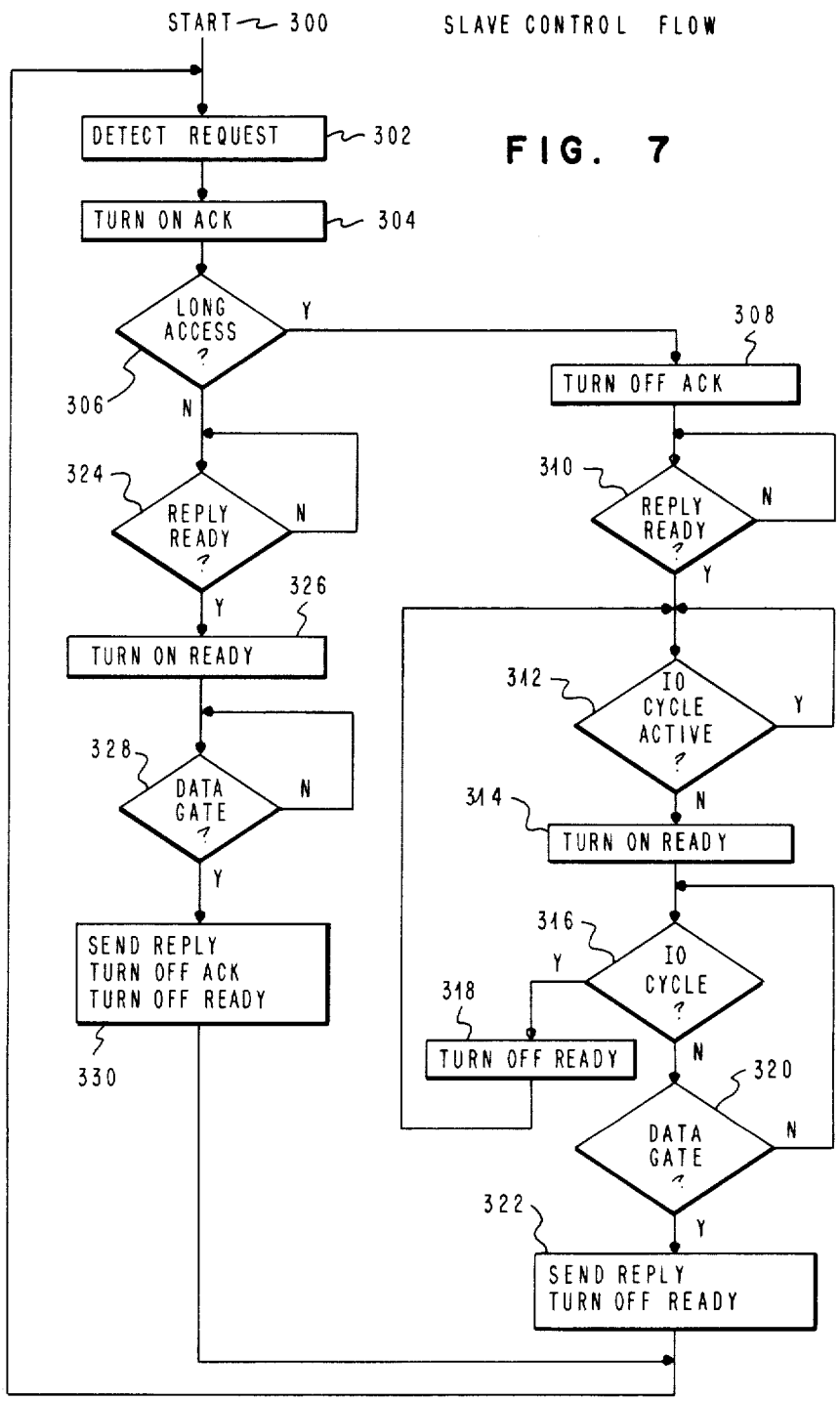
FIG. 7 is a flow chart illustrating the bus procedures performed by the long access slave device.

FIG. 7 is a flow chart for the long access slave device 24 in performing long or short access operations. The sequencer for the slave device starts in position 300 and proceeds to step 302 to determine if a request has been received. If a request has been received, the slave device activates the ACK line 58 to indicate it has received this request in step 304. The slave sequencer proceeds to step 306 to determine if the operation requested is a long access operation. If not, the slave sequencer proceeds to step 324 to determine if the response is ready. The slave sequencer continues to loop at step 324 until the response does become ready. At which time it proceeds to step 326 to activate the READY line 62. The slave sequencer proceeds to step 328 to determine if the DATA GATE signal on line 60 has been received. If not, it waits in a loop at step 328. When the DATA GATE signal is received, the sequencer proceeds to step 330. to send the reply and to turn off the ACK signal on line 58 and the READY signal on line 62. The sequencer then loops back to the start position 300.

Returning to step 306, if the slave sequencer determines that a request is a long access request, the sequencer proceeds to step 308 to turn off the ACK signal on line 58 indicating to the requesting bus master that this request is a long access request. The sequencer then proceeds to step 310 to determine when the response is ready. When this response does become ready, the sequencer proceeds to step 312 to determine if the 10 cycle line is active. If the IO cycle line is active, the sequencer loops back to step 312. Once the IO cycle becomes inactive, the sequencer proceeds to step 314 to activate the READY line 62. The sequencer then determines if the IO cycle has been reactivated in step 316. If so, the sequencer turns off the READY signal on line 62 in step 318 and returns to step 312 to wait for the IO cycle to go inactive again. IO the IO signal remains inactive in step 316, the sequencer proceeds to step 320 to determine if the DATA GATE signal on line 60 has been activated. If not, the sequencer loops back to step 316. If so, the sequencer then, in step 322, sends the response reply on the data lines 52 and turns off the READY signal on line 62 and returns to start position 300.

Although the invention has been described with reference to this specific embodiment, this description is not meant to be construed in a limiting sense. Various modification of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of the invention.

We claim:

1. A data processing system including a first plurality of master devices connected to communicate on an asynchronous bus wherein only one master device can control communications over said bus at any one time and a second plurality of slave devices connected to said bus to respond to communications from any master device, said system comprising:

means connect ed to said bus, for a first master device to control communications on said bus and initiate a request for data from a first slave device and then relinquish control of the bus to a second master device, means connected to said bus, for said second master device to control communications on said bus and control communications between the second master device and other devices;

means connected to said bus, for said first slave device to signal the second master device that communications between the first master device and the first slave device is requested; and means connected to said bus, for said second master device to relinquish control of said bus to the first master device until communications between the first master device and the first slave device is completed.

2. The data processing system according to claim 1 wherein each master device includes means for providing a timing signal to the bus while controlling communications on the bus.

3. The data processing system according to claim 2 wherein said means for the second master device to control communications on the bus includes means to recognize a first signal on the bus from said first slave device indicating that communications between the first master device and the slave device is requested.

4. The data processing system according to claim 3 wherein said second master device includes means for providing a second signal on the bus indicating that the second master device is relinquishing control of said bus.

5. The data processing system according to claim 4 wherein said first master device includes means for receiving the first and second signals and for providing a third signal on the bus indicating that the first master device is controlling the bus.

6. The data processing system according to claim 5 wherein first slave device includes means for using said second signal to respond to a transmission from a master device.

7. A data processing system including a plurality of devices connected to a communications bus for intercommunication between said devices, said system comprising:

a plurality of master devices, each including means, connected to said bus, for providing regulated asynchronous communications of said bus;

a plurality of slave devices, each including means, connected to said bus, for responding to communications from one of said master devices by receiving information from or transmitting information of said bus;

means, connected to said bus and each master device, for designating one of said master devices to regulate communications on said bus; and means, connected to said designating means, for enabling a master device, not designated, to regulate communications on said bus for a single communications transaction returning regulation to said designated master device after completion on the single communication transaction.

8. A data processing system according to claim 7 wherein at least one slave device includes means for indicating to said enabling means that a bus master, not designated, should be enabled to provide said communications transaction.

9. A data processing system according to claim 8 wherein said communications transaction is between said indicating slave device and said not designated master device.

10. A data processing system according to claim 9 wherein said single communications transaction includes a response by said sleeve device to a request by said not designated master device that had been received previously when said not designated device had been previously designated by said designating means.

11. A data processing system according to claim 10 wherein said slave device indicating means includes means for providing a signal on said bus to said enabling means indicating that a not designated master device should be enabled to provide said single communications transaction.

* * * * *

UNITED STATES PATENT AND TRADEMARK OFFICE
CERTIFICATE OF CORRECTION

PATENT NO. : 4,817,037

DATED : March 28, 1989

INVENTOR(S) : H. Hoffman et al

It is certified that error appears in the above-identified patent and that said Letters Patent is hereby corrected as shown below:

Col. 8, line 3, delete "connect ed" and insert --connected--.
Col. 8, line 64, delete "on" and insert --of--.
Col. 9, line 9, delete "sleeve" and insert --slave--.

Signed and Sealed this

Tenth Day of December, 1991

Attest:

HARRY F. MANBECK, JR.

*Attesting Officer*  *Commissioner of Patents and Trademarks*